United States Patent
Rosenkranz et al.

[11] Patent Number: 6,010,741
[45] Date of Patent: Jan. 4, 2000

[54] APPARATUS AND METHOD FOR CONTROLLING THE COATING THICKNESS OF AN OPTICAL GLASS FIBER

[75] Inventors: Jürgen Rosenkranz, Mönchengladbach; Hans-Jürgen Lysson, Korschenbroich; Wilhelm Reiners, Wegberg; Franz-Peter Bartling, Düsseldorf, all of Germany

[73] Assignee: Alcatel, Paris, France

[21] Appl. No.: 09/102,231

[22] Filed: Jun. 22, 1998

[30] Foreign Application Priority Data

Jun. 28, 1997 [DE] Germany ............................ 197 27 574

[51] Int. Cl.$^7$ ............................ B05D 5/06; C03B 37/07; B05C 11/00
[52] U.S. Cl. ............................ 427/9; 427/163.2; 118/712; 118/67; 118/68; 118/69; 118/405; 65/382
[58] Field of Search ............................ 427/9, 10, 163.2; 118/712, 67, 68, 69, 405; 65/382

[56] References Cited

U.S. PATENT DOCUMENTS 5,013,130  5/1991  Atkins et al. ........................ 427/163.2

FOREIGN PATENT DOCUMENTS

| | | |
|---|---|---|
| 0 320 384 A1 | 6/1989 | European Pat. Off. . |
| 0 619 275 A2 | 10/1994 | European Pat. Off. . |
| 44 12 563 A1 | 10/1995 | Germany . |
| 2 287 244 | 9/1995 | United Kingdom . |
| WO 97/20237 A2 | 6/1997 | WIPO . |

OTHER PUBLICATIONS

Patent Abstracts of Japan, vol. 012, No. 365 (C–532), Sep. 29, 1998 for JP 63 117934 A (Showa Electric Wire & Cable Co Ltd), May 21, 1998.

Patent Abstracts of Japan, vol. 018, No. 140 (C–1177), Mar. 8, 1994 for JP 05 319852 A (Fujikura Ltd), Dec. 3, 1993.
Patent Abstracts of Japan, vol. 004, No. 038 (C–004), Mar. 27, 1980, for JP 55 010470 A (NT&T Corp et al), Jan. 24, 1980.
Patent Abstracts of Japan, vol. 015, No. 377 (C–0870), Sep. 24, 1991 for JP 03 153541 A (Sumitomo Elec Ind. Ltd), Jul. 1, 1991.
Patent Abstracts of Japan, vol. 009, No. 175 (C–292), Jul. 19, 1985 for JP 60 046954 A (Nippon Denshin Denwa Kosha) Mar. 14, 1985.
Patent Abstracts of Japan, vol. 010, No. 383 (C–393), Dec. 23, 1986 for JP 61 174133 A (Hitachi Cable Ltd), Aug. 5, 1986.
Patent Abstracts of Japan, vol. 096, No. 011, Nov. 29, 1996 for JP 08 169732 A (Yazaki Corp), Jul. 2, 1996.
Patent Abstracts of Japan, vol. 011, No. 273 (C–445), Sep. 4, 1987 for JP 62 078126 A (Sumitomo Electric Ind Ltd), Apr. 10, 1987.
Patent Abstracts of Japan, vol. 010, No. 090 (C–337), Apr. 8, 1986 for JP 60 221337 A (Fujikura Densen KK et al), Nov. 6, 1985.

*Primary Examiner*—Katherine A. Bareford
*Attorney, Agent, or Firm*—Ware, Fressola, Van der Sluys & Adolphson LLP

[57] ABSTRACT

An apparatus is proposed for controlling the coating thickness of an optical fiber (2) passing sequentially, in that order, from a unit (1) for fabricating the fiber (2) through a cooling unit (3), a coating unit (4) and along a device (5) which determines the diameter of the fiber. The apparatus includes a control element (14) for controlling a control device (15, 16) as a function of the measured diameter in such a way that the thickness of the coating corresponds to a target value, wherein the control device (15, 16) is placed before the coating unit (4) when viewed in the transport direction of the fiber (2), and the control device (15,16) adjusts the temperature of the fiber (2). Also described is a method for controlling the coating thickness.

11 Claims, 4 Drawing Sheets

APPARATUS AND METHOD FOR CONTROLLING THE COATING THICKNESS OF AN OPTICAL GLASS FIBER

BACKGROUND OF THE INVENTION

1. Technical Description

The invention relates to an apparatus and a method for controlling the coating thickness of an optical fiber.

2. Description of the Prior Art

Optical fibers are used, for example, in fiber optic cables. Immediately after their manufacture, the fibers are usually coated with a coating in a continuous process for protecting the surface. The fiber is fabricated by a conventional process, i.e. drawn from a molten preform in a drawing furnace. Because the drawing process is performed at high temperatures (for glass fibers at approximately 2,000° C.), while the coating is typically applied at temperatures below approximately 100° C., the fiber generally passes through a cooling unit placed between the manufacturing unit and the coating unit. Inside the cooling unit, the fiber most commonly moves in a protective gas flow which protects the surface of the fiber from aggressive air constituents and dust particles.

In the coating unit, the fiber passes through a bath containing the frequently pressurized liquid coating material and exits through a coating nozzle. The thickness of the surface coating depends both on the drawing speed of the fiber and the viscosity of the coating material. In addition, the coating unit generally includes a UV lamp system, since preferably UV-Hardenable coating materials are used.

A constant coating thickness is essential for the quality of the fibers and is consequently defined within narrow limits. In a last step, the fiber including the coating passes through a measuring device for measuring the fiber diameter. The measured value is then transmitted to a control element which as a function of the measured diameter controls a control device so that the coating diameter is constant.

The publication EP 619 275 A2 illustrates an apparatus of the aforedescribed type. The control device therein is a temperature controller which is located in the coating unit and adjusts the temperature of the liquid coating material. As a result, the viscosity and correspondingly the quantity of the material exiting the coating nozzle changes. The coating thickness can then be controlled to coincide with a target value.

Disadvantageously, however, the changed viscosity of the coating material also alters its flow characteristics, causing undesirable variations in the properties of the applied coating. This is primarily caused by the change in the material properties of the coating due to shear processes between the different layers of the liquid in the regions of the coating nozzle where the coating material acts as a non-Newtonian fluid if traditional process parameters are used. Moreover, the control speed, the control accuracy and the dimensional tolerances of the adjustable thickness region are inadequate, in particular if the drawing speed of the fiber which is used to adjust the core diameter, is changed over a wide range at the beginning and the end of the fiber manufacturing process. These effects as well as environment conditions lead to variations in the fiber temperature, thereby reducing control over the coating process.

SUMMARY OF THE INVENTION

It is therefore the object of the invention to obviate these disadvantages and to provide an apparatus and a method for controlling the coating thickness of an optical fiber which improves control over the coating process and generates more homogeneous coatings.

The invention is based on the observation that the thickness of the coating can be influenced by varying the fiber temperature. For the purpose, a control device capable of setting the temperature of the fiber is placed in front of the coating unit. The fiber temperature can be varied as desired over the range defined by the thermal stability of the coating material. Conversely, the temperature of the supplied liquid coating material and of the components of the coating unit are usually held constant. When the fiber enters the coating material, the temperature set-point of the fiber can be different from the optimum coating temperature which is attained via heat exchange with the coating material.

In the proposed apparatus, the coating thickness of the fiber is controlled while the coating unit remains at a constant temperature. The homogeneity of the coating properties are advantageously improved. In addition, the coating parameters are much better controlled, especially when the supplied coating material and the coating unit itself are held at a constant temperature with a control device. Unintentional temperature variations of the fiber in the coating unit, e.g. due to a change in the drawing speed, are then eliminated.

In an advantageous embodiment of the invention, the control device is a heating or cooling element, through which the fiber passes. Electrical heating and cooling elements are preferred because these can be controlled with extreme accuracy. In a simple and useful embodiment, a coiled heating wire concentrically surrounds the fiber. This heater has a small heat capacity and is capable of controlling the fiber temperature easily and without noticeable delay.

The control device can be advantageously disposed between the cooling unit and the coating unit, if the control device is in the form of a heating and cooling element, respectively. The control device can also be attached to the cooling unit at a point where the fiber exits the cooling unit. Alternatively, the control device can be spaced apart from the cooling unit to reduce heat flow between the control device and the cooling unit and consequently also the time lag of the control device.

The temperature of the fiber can not only be varied by effecting the fiber temperature directly, but the control device can also adjust an operating parameter of the cooling unit. The control device can, for example, adjust the temperature of a surface of the cooling element proximate to the location where the fiber passes by; more particularly, the control device can change the temperature or the volume flow of a cooling medium which carries away heat from the jacket of the cooling element. The control device can furthermore influence parameters of the respective medium, in general a protective gas, which in the cooling unit removes the heat from the fiber. For example, the inlet temperature of the protective gas in the cooling unit or its volume flow can be changed. In particular, the fiber temperature can be changed rapidly by altering the composition of the protective gas. For example, if helium is used as the protective gas, an admixture of nitrogen will reduce the heat conduction and thus the heat removal.

Since the changes required in the fiber temperature for controlling the coating thickness are comparatively small compared to the total temperature difference along the fiber, the coating unit is advantageously subdivided into two stages. The first stage, when viewed in the transport direction of the fiber, supplies the major cooling power and is operated under constant operating conditions. The cooling power of the second stage is smaller than that of the first stage and is controlled in the manner described above. This reduces the time lag of the control circuit, so that the coating thickness can be adjusted easily and without a significant delay. If necessary, a heater can also be provided in the second stage, if the fiber is cooled in the first stage below the desired temperature set-point.

In the present state-of-the-art technology, a second surface coating is most commonly applied once the coating on the fiber surface has hardened. A control circuit is often not required to actively control the coating thickness, since the fiber temperature and the diameter of the primary protection were already precisely adjusted in the immediately preceding first coating unit. Moreover, both the mass per unit length and the heat capacity of the fiber increase due to the first coating, which in turn reduces temperature variations and increases the power required for controlling the process. In this case, too, the coating thickness can be better controlled with an active control. Subsequent to the second coating unit, the fiber passes through an additional measuring device which measures the diameter of the fiber. An additional control device is controlled as a function of the fiber diameter, which then adjusts the temperature of the fiber prior to entering the second coating unit. Preferably, the additional control device is a heating and/or cooling element disposed between the two coating units; however, another cooling element can also be provided, with the control device adjusting one of the operating parameters described above. All control devices are advantageously controlled by a common control element.

In an advantageous method for controlling the coating thickness of an optical fiber, the fiber is initially fabricated at an elevated temperature, in particular from a glass melt, and is subsequently cooled approximately to a suitable coating temperature. The fiber is then coated by passing through a hardenable liquid coating material. Either the fiber diameter including the coating or only the thickness of the coating itself is measured. A control device controls the cooling power or a heating element disposed between cooling and coating so as to provide a constant coating thickness. If the fiber is coated in a coating nozzle, then an increase in the fiber temperature reduces the coating thickness, whereas a decrease in the fiber temperature increases the coating thickness. These values are controlled in a conventional manner with a set-point controller.

To control the coating thickness exclusively with a simple and rapidly responding heating element, the fiber can be initially cooled below the range of suitable coating temperatures. The heating power of a heating element which is located subsequent to the coating unit, is then controlled so that the fiber attains the temperature set-point at which the coating thickness reaches its target value.

The thickness of one or more additional coatings applied on top of the primary coating can be adjusted in a similar fashion. The fiber is here coated once more and the fiber diameter including the coating is measured. Before the additional coating unit, there is located a heating or cooling element which adjusts the temperature of the fiber as a function of the measured diameter so that the coating thickness corresponds to a target value.

Embodiments of the invention will be described in the subsequent description with reference to the schematic drawings.

DETAILED DESCRIPTION OF THE INVENTION

Figure 1:
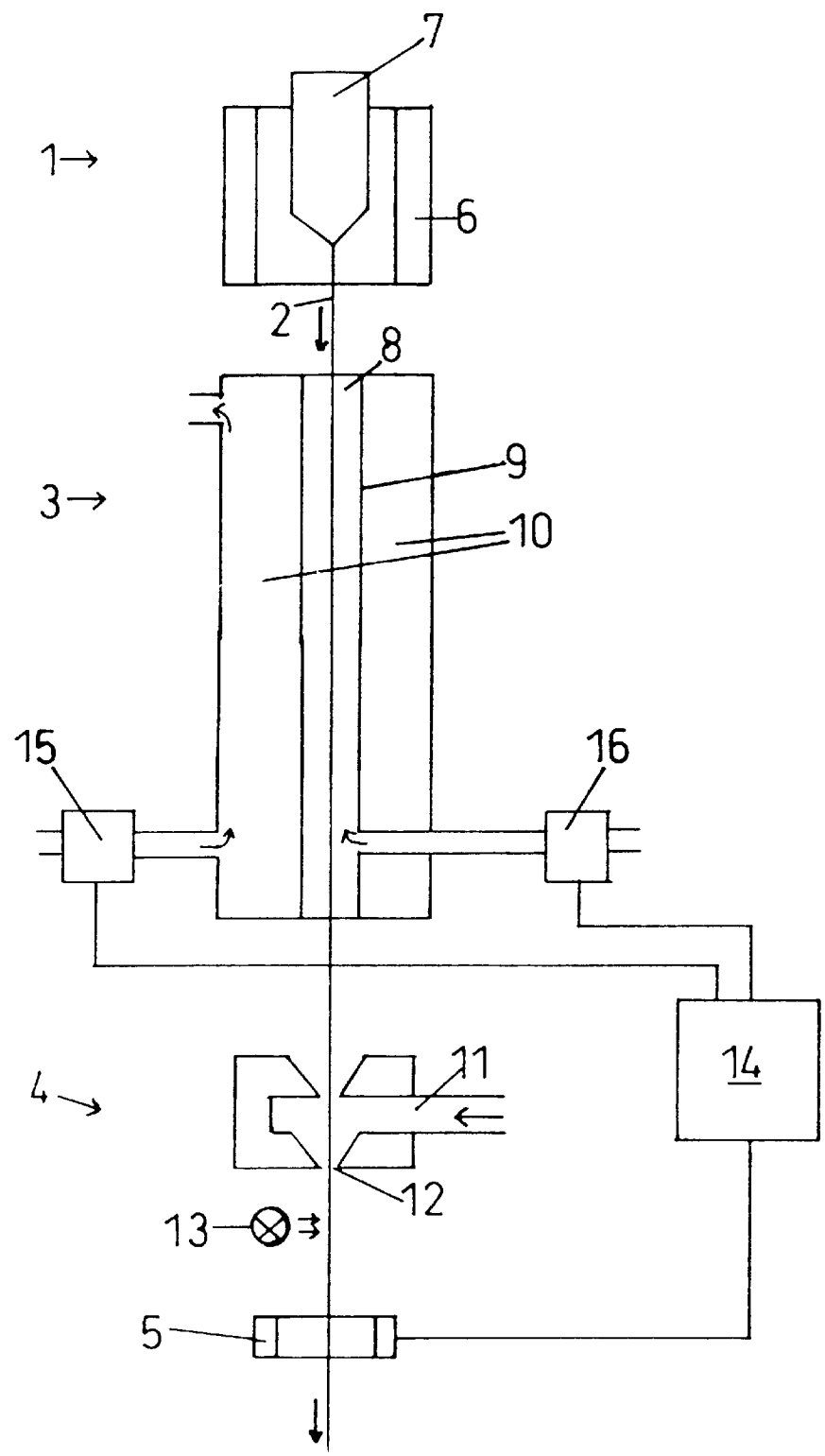
FIG. 1 is a schematic view of a coating apparatus of the invention.

The apparatus illustrated in FIG. 1 essentially comprises a unit 1 for manufacturing the fiber 2 and a subsequent cooling unit 3, a coating unit 4 and a diameter measuring device 5, through which the fiber 2 passes successively, in that order.

The manufacturing unit 1 includes a drawing furnace 6 where the fiber is drawn from the lower tip of the preform 7 which has melted in this region. The diameter of the fiber 2 is held constant by varying the drawing speed.

In the cooling unit 3 which is frequently also referred to as a fiber protection tube, the fiber 2 is cooled down from the temperature of the drawing furnace 6 to the range of temperatures suitable for coating. A protective gas 8 flows through the cooling unit 3 to prevent air from coming in contact with the fiber 2 and to remove heat to the surface 9 of the cooling jacket through which a cooling medium 10 passes.

In the coating unit 4, the surface of the fiber 2 is coated with a liquid coating material 11 which is applied under pressure in a coating nozzle 12 and subsequently hardened with a UV light source 13. The thickness of the coating itself or of the total diameter of the fiber 2 including the coating is measured in diameter measuring device 5.

The so determined value is then transmitted to a control element 14, e.g. a computer, which controls the target value. The control element 14 can be connected via power switching elements with one or more control devices 15, 16 adapted to control the temperature or the volume flow of the cooling medium 10 or the composition, temperature or the volume flow of the protective gas 8 flowing into the cooling unit 3. Several of these parameters can be controlled concurrently.

When the fiber 2 enters the coating unit 4, the temperature of the fiber 2 can then be adjusted and controlled to coincide with a set-point. As a result, the viscosity of the liquid coating material 11 on the surface of the fiber 2 changes and consequently also the quantity exiting from the coating nozzle 12. The coating thickness changes as a result and decreases with increasing temperature of the fiber 2.

Figure 2:
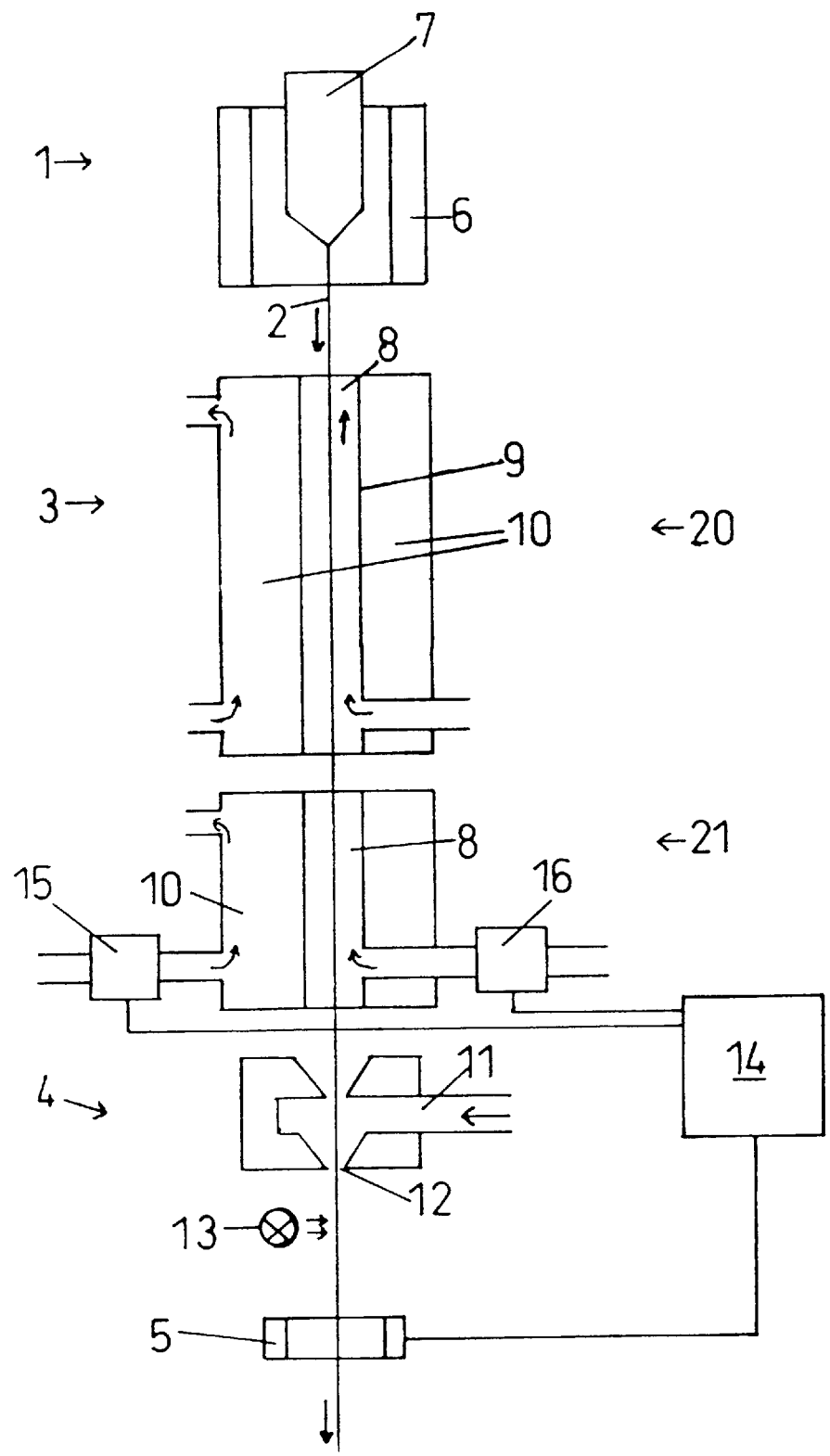
FIG. 2 is a schematic view of an alternative embodiment of the apparatus.

In FIG. 2, there is illustrated a coating unit with elements cooperating in a similar fashion. Unlike the previously described example, the cooling unit 3 here comprises two stages 20, 21. The first stage 20 is operating with constant parameters for the protective gas 8 and the cooling medium 10, providing the major portion of the cooling power. The control element 14 only controls the second stage 21 of the cooling unit 3 with the help of the control devices 15,16 in the manner described above. The control properties are improved considerably.

Figure 3:
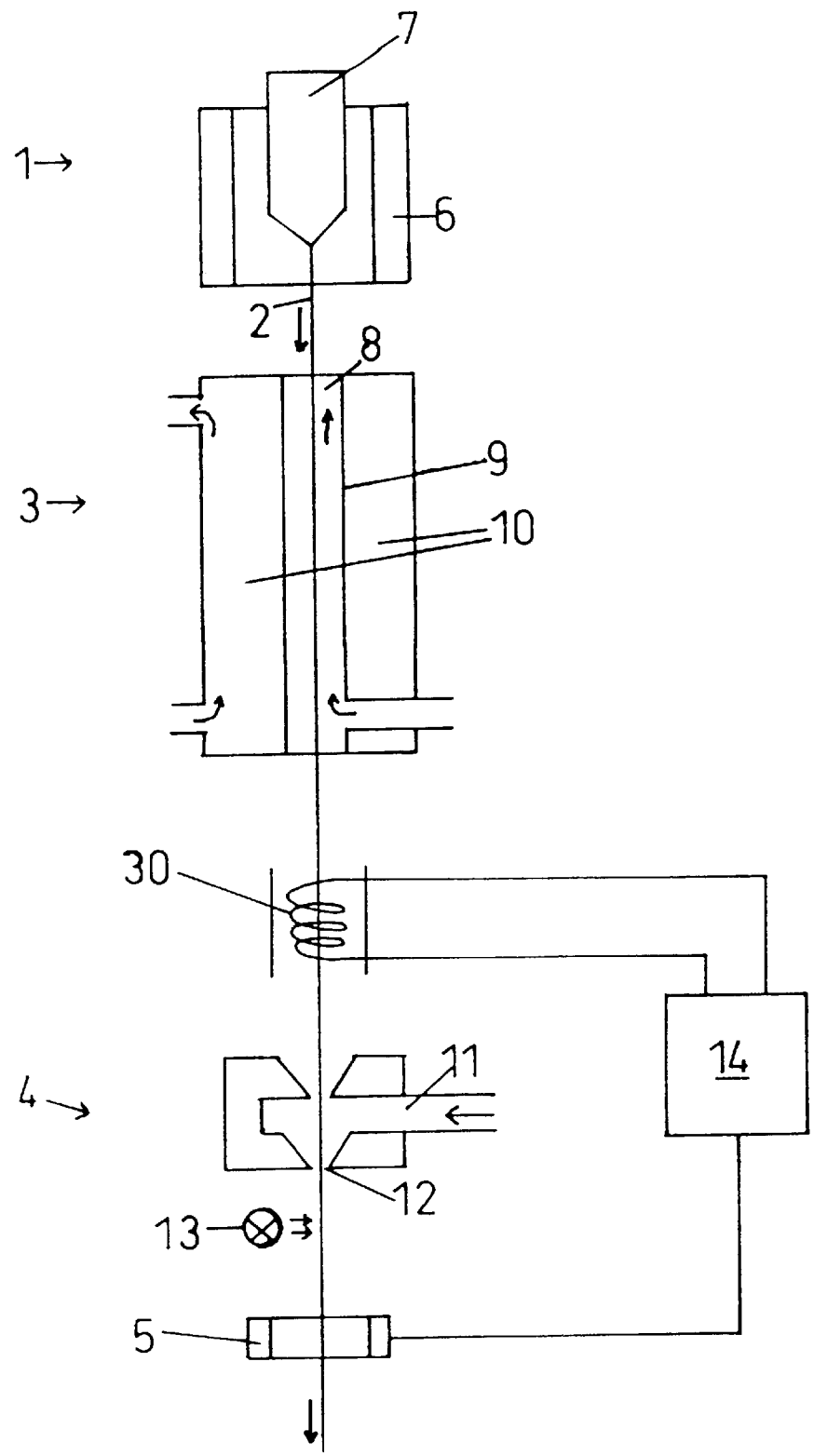
FIG. 3 is a schematic view of the apparatus wherein the coating thickness is controlled by an electric heater.

The third possibility for controlling the coating thickness is illustrated in FIG. 3, where the control device is a heating element 30. The apparatus is operated so that the fiber 2 is cooled in the cooling unit 3 below the range of suitable temperature set-points for coating or to the minimum practical value. The control element 14 controls the current through the heating element 30 which heats the fiber to the required temperature set-point for achieving the target value of the coating thickness.

Figure 3A:
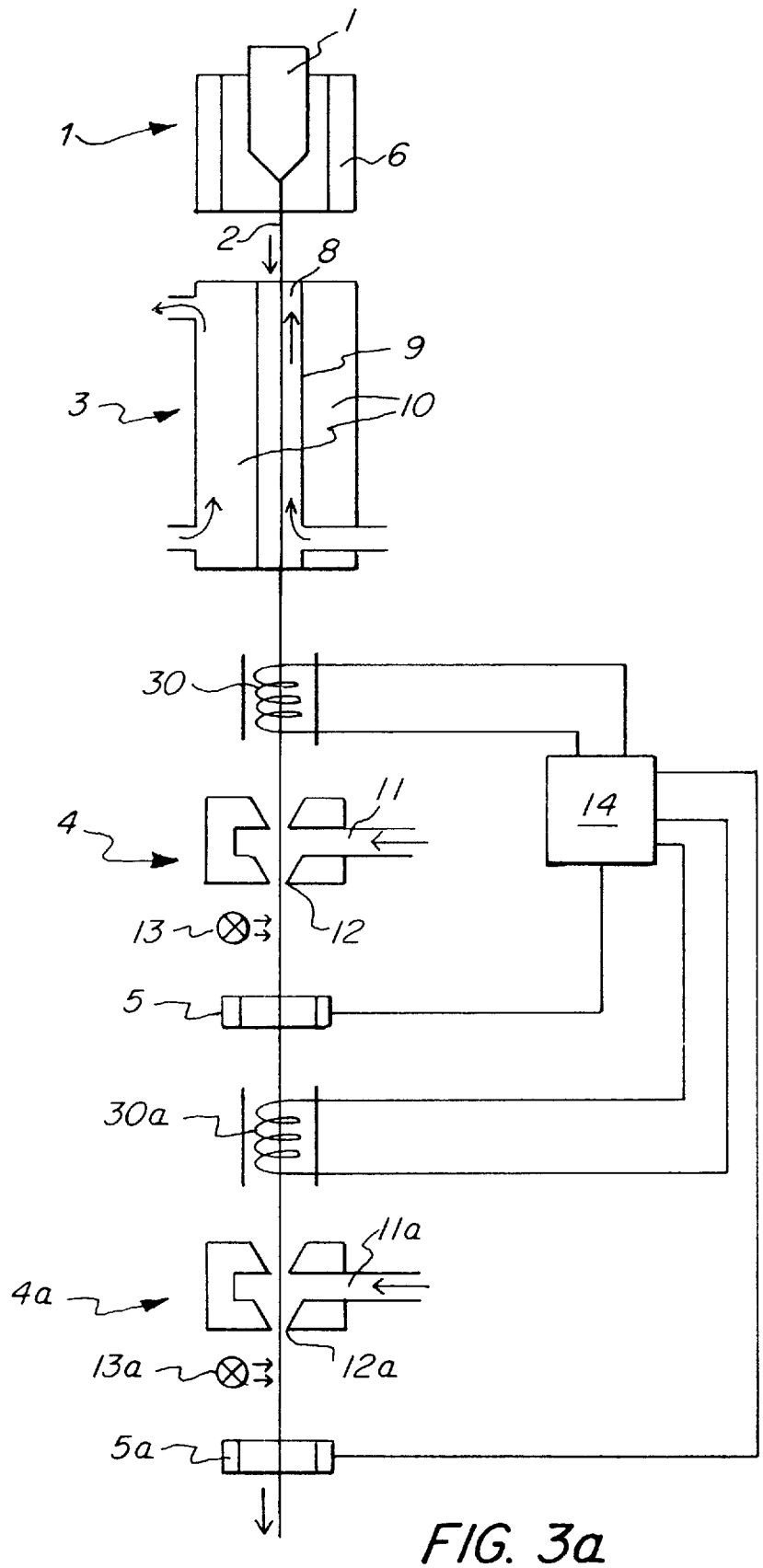
FIG. 3a is a schematic view of the apparatus of FIG. 3 with an additional coating station for providing an additional coating on the fiber.

As shown in FIG. 3*a*, an additional surface coating can be applied by an additional coating unit 4*a* once the initial coating on the fiber surface has hardened. The coating unit 4*a* applies coating material 11*a* which is applied under pressure in a coating nozzle 12*a* and subsequently cured with a UV light source 13*a*. A control circuit is often not required to actively control the coating thickness, since the fiber temperature and the diameter of the primary protection were already precisely adjusted in the immediately preceding first coating unit 4. Moreover, both the mass per unit length and the heat capacity of the fiber increase due to the initial coating, which in turn reduces temperature variations and increases the power required for controlling the process. However, in FIG. 3*a*, the coating thickness can be better controlled with an active control. Subsequent to the additional coating unit 4*a*, the fiber passes through an additional measuring device 5*a* which measures the diameter of the fiber with the initial and additional coatings. An additional control device, i.e. a heating element 30, is controlled as a function of the fiber diameter, which then adjusts the temperature of the fiber prior to entering the additional coating unit 4*a*. The additional control device can be a heating and/or cooling element disposed between the two coating units; however, another cooling element can also be provided, with the control device adjusting one of the operating parameters described above. All control devices are advantageously controlled by a common control element 14.

As a result, the coating apparatus of the invention provides an improved homogeneity of the coating properties and a rapid and precise control of the coating thickness.

What is claimed is:

1. Method for controlling coating thickness of an optical fiber, comprising the steps of:
   (a) fabricating the fiber at an elevated temperature;
   (b) cooling the fiber down to a temperature below a set-point at which the coating thickness corresponds to a target value,
   (c) providing an initial coating on the fiber using a liquid coating material;
   (d) measuring either diameter of the fiber and the coating or just the coating thickness; and
   (e) regulating temperature of the fiber based on the measuring step (d) to the set-point by heating the fiber as the fiber enters the coating step so that the coating thickness corresponds to the target value.

2. The method of claim 1, further comprising the step of providing an additional coating on the fiber and determining an additional measured diameter of the fiber with the initial and additional coatings, and regulating the temperature of the fiber with the initial coating thereon prior to the additional coating step as a function of the additional measured diameter to an additional set-point at which the coating thickness of the additional coating corresponds to a target value.

3. Method for controlling coating thickness of an optical fiber, comprising the steps of:
   (a) fabricating the fiber at an elevated temperature;
   (b) cooling the fiber,
   (c) providing an initial coating on the fiber using a liquid coating material;
   (d) measuring either diameter of the fiber and the coating or just the coating thickness; and
   (e) regulating temperature of the fiber based on the measuring step (d) as the fiber enters the coating step so that the coating thickness corresponds to a target value, wherein the regulating step includes heating the fiber after the cooling step.

4. The method of claim 3, further comprising the step of providing an additional coating on the fiber and determining an additional measured diameter of the fiber with the initial and additional coatings, and regulating the temperature of the fiber with the initial coating thereon prior to the additional coating step as a function of the additional measured diameter to an additional set-point at which the thickness of the additional coating corresponds to a target value.

5. Apparatus for controlling coating thickness of an optical fiber passing sequentially, in a transport direction, from a unit for fabricating the fiber through a cooling unit, a coating unit for providing an initial coating and along a device which determines a measured diameter of the fiber with the initial coating, wherein the apparatus comprises a control element for controlling a cooling device as a function of the measured diameter in such a way that the coating thickness corresponds to a target value, the control device is a heating element through which the fiber passes, the control device is placed before the coating unit when viewed in the transport direction of the fiber, and the control device adjusts temperature of the fiber.

6. Apparatus according to claim 5, wherein the heating element is operated electrically.

7. Apparatus according to claim 5, wherein the control device is placed subsequent to the cooling unit.

8. Apparatus according to claim 5, wherein the control device adjusts at least one operating parameter of the cooling unit.

9. Apparatus according to claim 8, wherein the at least one operating parameter is chosen from a group consisting of temperature of a surface of the cooling unit and composition, inlet temperature and volume flow of a protective gas in the cooling unit.

10. Apparatus according to claim 8, wherein the cooling unit comprises a first stage and a second stage and the control device adjusts the at least one operating parameter in the second stage.

11. Apparatus according to claim 5, further comprising an additional coating unit through which the fiber with the initial coating passes to provide an additional coating, the additional coating unit equipped with an additional measuring device for measuring an additional diameter of the fiber with the initial and additional coatings and an additional control device which is controlled as a function of the additional diameter in such a way that the thickness of the initial and additional coatings are constant and the additional control device adjusts the temperature of the fiber with the initial coating thereon before entering the additional coating unit.

* * * * *

UNITED STATES PATENT AND TRADEMARK OFFICE
CERTIFICATE OF CORRECTION

PATENT NO. : 6,010,741
DATED : January 4, 2000
INVENTOR(S) : Jurgen Rosenkranz et al.

It is certified that error appears in the above-identified patent and that said Letters Patent is hereby corrected as shown below:

In column 6, line 25 (claim 5, line 7), "cooling" should be --control--.

Signed and Sealed this

First Day of August, 2000

*Attest:*

*Attesting Officer*

Q. TODD DICKINSON

*Director of Patents and Trademarks*